United States Patent [19]

Matsuda et al.

[11] Patent Number: 5,432,408
[45] Date of Patent: Jul. 11, 1995

[54] FILLING COMPOSITION FOR INCANDESCENT LAMP, AND INCANDESCENT LAMP CONTAINING THE SAME AND ITS USE

[75] Inventors: Osamu Matsuda, Okayama; Takahiro Yaguchi, Tokyo, both of Japan

[73] Assignee: Ken Hayashibara, Okayama, Japan

[21] Appl. No.: 171,775

[22] Filed: Dec. 22, 1993

Related U.S. Application Data

[63] Continuation of Ser. No. 848,518, Mar. 9, 1992, abandoned.

[30] Foreign Application Priority Data

Apr. 9, 1991 [JP] Japan .................................. 3-103854
Apr. 9, 1991 [JP] Japan .................................. 3-103855

[51] Int. Cl.⁶ .......................................... H01J 17/20
[52] U.S. Cl. ............................ 315/200 R; 315/291; 313/643; 313/630
[58] Field of Search ................. 315/200 R, 291, 630; 313/643, 578, 579, 580, 255, 258

[56] References Cited

U.S. PATENT DOCUMENTS

| | | | |
|---|---|---|---|
| 2,115,480 | 4/1936 | Claude | 313/643 |
| 4,524,302 | 6/1985 | Berlec | 313/579 |
| 4,736,138 | 4/1988 | Masaki | 315/291 |
| 5,126,636 | 6/1992 | Masaki | 315/291 |

FOREIGN PATENT DOCUMENTS

| | | |
|---|---|---|
| 0262950 | 9/1987 | European Pat. Off. . |
| 0242022 | 10/1987 | European Pat. Off. . |
| 21226790 | of 0000 | Japan . |
| 54-2068 | 1/1979 | Japan . |
| 60-95850 | 5/1985 | Japan . |
| 61-193398 | 8/1986 | Japan . |
| 62-185516 | 8/1987 | Japan . |
| 62-211853 | 9/1987 | Japan . |
| 63-88792 | 4/1988 | Japan . |
| 63-136492 | 6/1988 | Japan . |
| 2212994 | 8/1989 | United Kingdom . |

*Primary Examiner*—Robert J. Pascal
*Assistant Examiner*—Reginald A. Ratliff
*Attorney, Agent, or Firm*—Browdy and Neimark

[57] ABSTRACT

A filling composition consisting essentially of about 20–75% by volume of xenon gas and about 15–80% by volume of nitrogen gas exhibits excellent luminous characteristics and an extended life expectancy but hardly causes arc discharge when enclosed in incandescent lamp. Incandescent lamps using the filling composition emit a light which is natural, appropriately high in color temperature, excellent in color rendering properties and gentle to the eye when operated at a voltage exceeding their rating but not exceeding 150% thereof.

16 Claims, 5 Drawing Sheets

F I G. 3
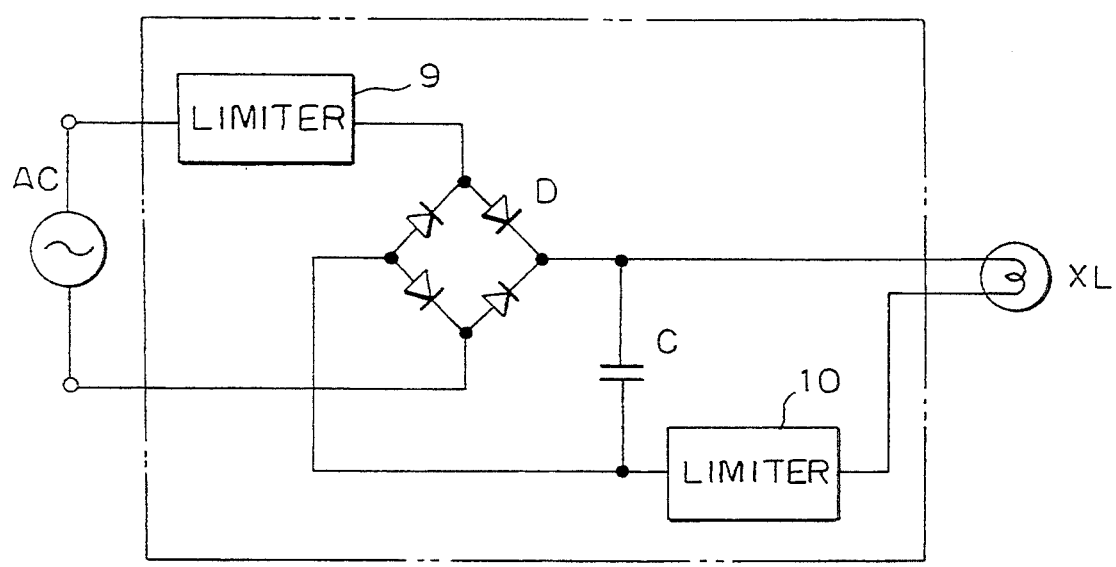

F I G. 6
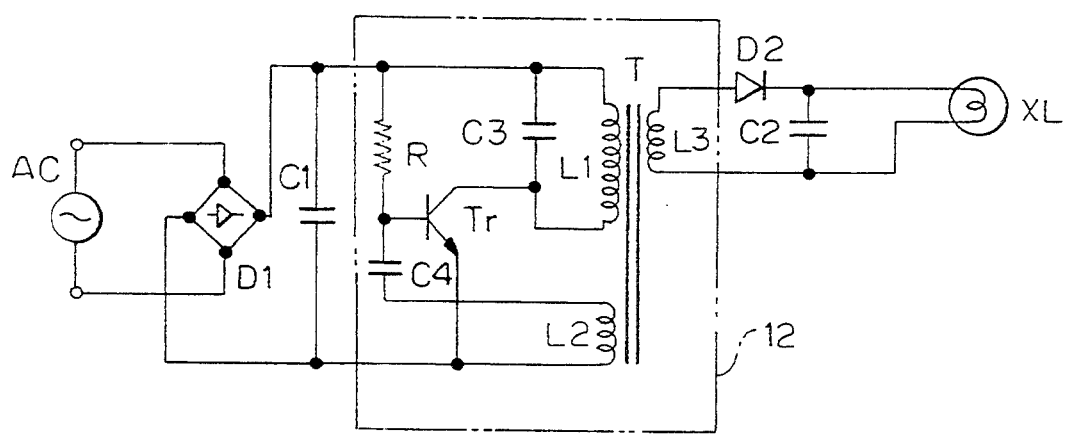
F I G. 7
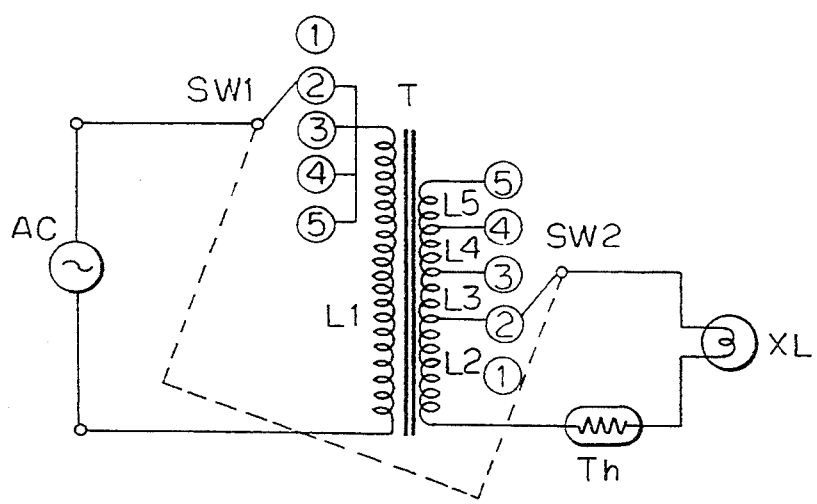

FILLING COMPOSITION FOR INCANDESCENT LAMP, AND INCANDESCENT LAMP CONTAINING THE SAME AND ITS USE

This application is a continuation of application Ser. No. 07/848,518 filed Mar. 9, 1992 now abandoned.

BACKGROUND OF THE INVENTION

1. Field of the Invention

This invention relates to a filling composition for incandescent lamp, and incandescent lamp containing the same and its use.

2. Description of the Prior Art

Generally, the elevation of filament temperature in incandescent lamps improves their luminous efficiency. Such an elevation however accelerates the vaporization of tungsten and the vaporized tungsten attaches and blackens on the inside surface of glass bulb, thus reducing luminous efficiency and life expectancy.

To suppress the vaporization of tungsten, incandescent lamps enclose inert gas such as nitrogen gas and/or rare gas, for example, argon gas, krypton gas and xenon gas. It is known that, in this case, the higher the molecular weight of the enclosed inert or rate gas, the heat loss on glass bulb becomes much less, thus enabling an elevated filament temperature.

Also is known that xenon gas has the highest molecular weight among these inert or rare gases and exhibits excellent luminous characteristics and extended life expectancy when enclosed in incandescent lamps. Xenon gas however has the disadvantages that its low ionization potential is causative of arc discharge to accelerate the burnout of filament when excessively enclosed in glass bulb. Because of this, it has been recommended that when xenon gas is enclosed in an incandescent lamp to be operated at a relatively high voltage, other inert or rate gas such as nitrogen gas and krypton gas is used in combination to give a xenon gas content less than about 10% by volume against the whole enclosed gaseous ingredients.

For example, Japanese Patent Kokai No.2,068/79 and No.211,853/87 disclose that an incandescent lamp enclosing in the glass bulb a composition containing nitrogen gas, krypton gas and xenon gas to give a xenon gas content of about 2-10% by volume against the whole enclosed gaseous ingredients exhibit an elevated arc starting voltage and excellent luminous characteristics. Such an incandescent lamp is however low in xenon gas content and this hinders the xenon gas to sufficiently elicit its inherent desirable properties. Both Japanese Patent Kokai also disclose that when xenon gas is enclosed in an amount exceeding 10% by volume, arc starting voltage reduces to a level which is no longer acceptable to practical use.

Japanese Patent Kokai No.95,850/85 discloses an incandescent lamp which encloses a composition consisting of nitrogen gas and 80% by volume or more xenon gas. Although this incandescent lamp exhibits excellent luminous characteristics, it has the disadvantages that a reduced arc starting voltage limits its use for miniature incandescent lamps, operating voltage of 12V or lower, power consumption of 8W or less, as well as that it requires a special pitch for filament winding in order to give a reduced electric field intensity for arc suppression.

As described above, there has been available no incandescent lamp which encloses xenon gas to a level high enough to wholly elicit the desirably properties of xenon gas but hardly causes arc discharge when operated at a relatively high voltage, usually, at a voltage not lower than that of standard ac line, in particular, about 90-150V.

SUMMARY OF THE INVENTION

In view of the foregoing, one object of this invention is to provide a filling composition for incandescent lamp which exhibits excellent luminous characteristics and extended life expectancy but hardly causes arc discharge when enclosed in incandescent lamps to be operated at a relatively high voltage, usually, at a voltage not lower than that of standard ac line, in particular, about 90-150V.

Another object of this invention is to provide an incandescent lamp which exhibits excellent luminous characteristics and extended life expectancy but hardly causes arc discharge when operated at a relatively high voltage, usually, at a voltage not lower than that of standard ac line, in particular, about 90-150V.

Still another object of this invention is to provide a lighting device wherein an incandescent lamp as luminous source is operated at a relatively high voltage, usually, at a voltage not lower than that of standard ac line, in particular, about 90-150V, to obtain excellent luminous characteristics.

We studied means for attaining these objects and found that a filling composition consisting essentially of xenon gas and nitrogen gas to give a xenon gas content of about 20-75% by volume against the whole enclosed gaseous ingredients exhibits excellent luminous characteristics and extended life expectancy but hardly causes arc discharge when enclosed in incandescent lamps to be operated at a relatively high voltage, usually, at a voltage not lower than that of standard ac line, in particular, about 90-150V, as well as that incandescent lamps enclosing such a filling composition are suitable as luminous source for lighting devices.

In particular, this invention relates to a filling composition for incandescent lamp consisting essentially of about 20-75% by volume of xenon gas and about 25-80% by volume of nitrogen gas.

This invention also relates to an incandescent lamp enclosing a filling composition consisting essentially of about 20-75% by volume of xenon gas and about 25-80% by volume of nitrogen gas.

This invention further relates to a lighting device using as luminous source an incandescent lamp wherein a filling composition consisting essentially of about 20-75% by volume of xenon gas and about 25-80% by volume of nitrogen gas is enclosed.

DETAILED DESCRIPTION OF THE INVENTION

In incandescent lamps enclosing a composition consisting essentially of about 20-75% by volume of xenon gas and about 25-80% by volume of nitrogen gas, the xenon gas exhibits excellent luminous characteristics and extended life expectancy, while the nitrogen gas enclosed at a specified ratio against the xenon gas effectively suppresses arc discharge, thus enabling a stabilized operation of the incandescent lamps.

Thus, by operating at a relatively high voltage, usually, at a voltage not lower than that of standard ac line, such an incandescent lamp easily attains excellent luminous characteristics and extended life expectancy which would be hardly realizable otherwise with conventional argon gas- or krypton gas-enclosed incandescent lamps.

For example, when xenon gas-enclosed incandescent lamps, rated wattage of 40-100W, rated voltage of 100 or 110V, are operated at a voltage approximately on the rating, one can obtain an extended life expectancy, in particular, about 3,000 hours or longer, which is about 1.5-fold or longer than that attained with conventional argon gas- or krypton gas-enclosed incandescent lamps. Thus, xenon gas-enclosed incandescent lamps are favorably usable in various interior or exterior lighting devices for housings and buildings wherein extended life expectancies are strongly required in order to save time and labor to exchange snapped incandescent lamps.

While, when xenon gas-enclosed incandescent lamps are operated at a voltage exceeding their rating, usually, at a voltage exceeding the rating but not exceeding 150% thereof, desirably, a dc voltage of about 105-130% of the rating, one can obtain over an extended time period a natural light which is excellent in color rendering properties and gentle to the eye.

For example, when xenon gas-enclosed incandescent lamps, rated wattage of 40-100W, rated voltage of 100 or 110V, are operated at a dc or ac voltage of about 105-130% of the rating, one can obtain over a period of about 200 hours or longer, desirably, about 400 hours or longer a natural light with a color temperature of about 2,900K or higher, desirably, about 2,950-3,100K and a total flux of about 500-1,300 lumens, such light being excellent in color rendering properties and gentle to the eye. Such an operation is feasible, for example, with usual ac power sources, ac/dc converter-type power sources, inverter-type power sources and switching regulator-type power sources: For example, lighting devices as disclosed in Japanese Patent Kakai No.193,398/86, No.185,516/87, No. 88,792/88, No.136,492/88 and Japanese Patent Application No.212,267/90 are suitable in such an operation. In particular, the use of any lighting device as disclosed in Japanese Patent Kakai No.193,398/86, No.185,516/87, No.88,792/88 and Japanese Patent Application No.212,267/90 leads to a light which is flickerless and suitable in various illuminations. It should be noted that operation at a voltage exceeding 150% of rating results in a shortened life expectancy of xenon gasenclosed incandescent lamps, as well as in the emission of a light with an elevated color temperature and a remarkable glare which make users to feel dazzling when used in illumination.

The light obtained by operating xenon gas-enclosed incandescent lamps at a voltage exceeding their rating has a continuous spectral distribution closer to morning sunlight which is said to be gentlest to the eye. Thus, such a light is favorably usable in various interior and exterior lighting devices for housings and buildings wherein excellent luminous characteristics are prior to life expectancy in view of eye health, color rendering property, luminous clarity and physiological activity.

Further, the light obtained in this way exhibits a remarkable efficacy in the prevention and treatment of diseases, for example, eyestrain, asthenopia, myopia, pseudomyopia and depression, as well as exhibiting superior activities of improving the formation and production in animals and plants. Because of these, this invention is favorably usable as physiotherapeutic means in domestic and medical uses, for example, in hospital and clinic, as well as lighting device in cultivating farms and factories such as poultry farm, fish farm and plant factory.

In addition, we found that the light obtained by operating xenon gas-enclosed incandescent lamps at a voltage exceeding their rating is richer in infrared rays, in particular, extreme infrared rays with a wavelength of 25-1,000 microns. Extreme infrared rays accelerate the perspiration, oxygen intake and blood circulation in animals to promote or improve their metabolism, lowering of blood pressure and blood sugar, excretion of metabolic products, relieving of obesity and rehabilitation, as well as relieving inflammatory pains and spasms. Thus, the lighting device of this invention wherein an incandescent lamp using a lead-free or low lead content glass bulb is used for higher infrared transmission is remarkably efficacious in the relaxation of myonic tonus by stiff shoulder and myalgia; in the relieving of spasms and dorsal pains by trauma, burn, rheumatism, arthritis, lambago, neuralgia, extermal otitis, tymanitis, nasosinusitis, tonsillitis, pharyngitis, laryngitis, throaty voice and visceral diseases; and in the prevention and treatment of geriatric diseases such as cancer, hepatitis and hepatocirrhosis. Because of these, the lighting device of this invention is favorably usable as physicotherapeutic means in domestics and medical clinical uses, for example, in hospital and clinic. Further, since extreme infrared ray-rich lights accelerate the growth of plants and exhibit a remarkable germicidal activity on microorganisms, the lighting device of this invention would find a use as germicidal means, in addition to uses as lighting device in cultivating farms and factories such as plant factory.

The above description explains two ways of lighting operation; one operation energizing xenon gas-enclosed incandescent with its rated voltage, and the other operation, with a voltage exceeding the rating. Regardless of lighting operation, by the practice of this invention, one or more unitized lighting devices can be subjected to lighting pattern control, time schedule control, daylight-interlocking control, wall switch control, centralized control and/or dimming control by appropriately locating the lighting device(s) in the above described housing or building, and controlling the lighting device(s) by one or more wire or wireless control methods such as individual wiring method, personal wiring multiplex method, telephone line method, power line carrier method, optical fiber method, electric wave control method, light control method, ultrasonic control method and acoustic control method using an appropriate lighting control system bearing, for example, dimming and switching circuits. Particularly in household lighting, one or more lighting devices of this invention can be totally controlled together with other electric equipments by incorporating the lighting device(s) into home bus system.

Several embodiments of this invention will be explained hereinafter in conjunction with the Figures.

BACKGROUND EXPLANATION OF THE FIGURES

FIG. 3 is a blockdiagram of an embodiment according to this invention.

FIG. 6 is an electric circuit of another embodiment according to this invention.

FIG. 7 is an electric circuit of still another embodiment according to this invention.

Figure 2:
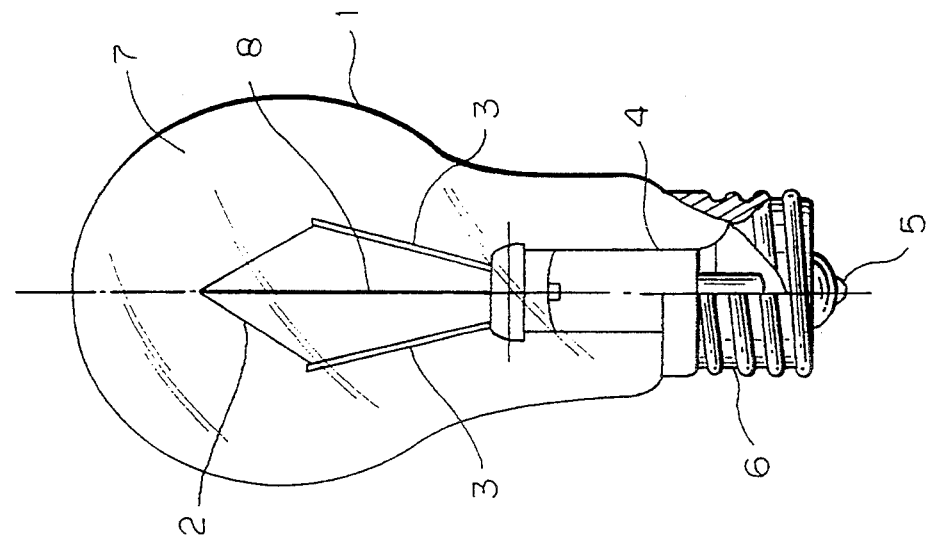
FIG. 2 is a partial cutaway view in elevation of another incandescent lamp for usual illumination according to this invention.

Throughout the Figures, reference numeral 1 designates glass bulb; 2, filament; 3, lead wire; 4, stem bulb; 5, eyelet; 6, base; 7, filling composition for incandescent lamp; 8, anchor wire; 9, arc discharge current-limiting circuit; 10, inrush current-limiting circuit; 11 illumination-controlling circuit; 12, inverter circuit; D, diode; XL, incandescent lamp; AC, ac source; SW, switch; R, resistor; C, capacitor; T, transformer; Tr, transistor; L, inductor or winding; Q, thyristor; Z, zener diode; Th, thermistor; U, lighting unit; and F, fuse.

DESCRIPTION OF THE PREFERRED EMBODIMENTS

Figure 1:
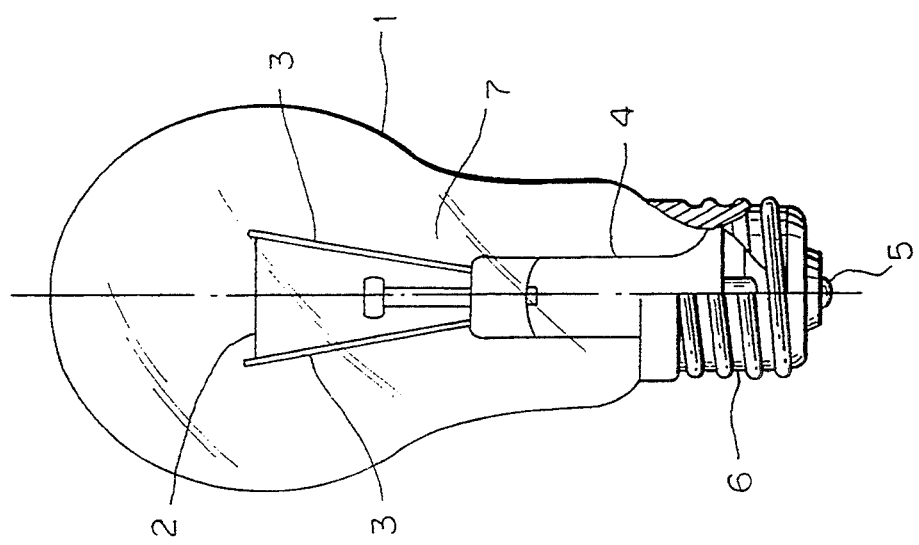
FIG. 1 is a partial cutaway view in elevation of an incandescent lamp for usual illumination according to this invention.

FIG. 1 shows a xenon gas-enclosed incandescent lamp for usual illumination, rated voltage of 100V, rated wattage of 60W. Reference numeral 1 designates a glass bulb with frosted inside surface, maximum diameter of 55 millimeters, maximum length of 105 millimeters, which is made of a soft glass such as soda-lime glass and lead glass. In the glass bulb 1, a double-coiled tungsten filament 2 is mounted and its ends are connected with lead wires 3, 3. The lead wires 3, 3 are hermetically sealed in a stem bulb 4, and their lead-out portions are connected with an eyelet 5 or a base 6 of brass or aluminum alloy.

In the glass bulb 1, a filling composition 7 for incandescent lamp, prepared by mixing xenon gas and nitrogen gas at a ratio of about 20:80 to about 75:25 by volume, is enclosed to give about 600 torr at ambient temperature and about 760 torr in incandescent state. The enclosing pressure is usually set to about 700–800 torr in incandescent state wherein xenon gas exhibits its inherent desirable luminous characteristics and extended life expectancy with causing no arc discharge when operated at a relatively high voltage, usually, at a voltage not lower than that of ac standard line, in particular, about 90–150V. Since such an enclosing pressure is sufficiently tolerable to usual soft glasses, the use of such a filling composition facilitates low-cost production of incandescent lamps with superior luminous characteristics and extended life expectancy. Although in this Example the inside surface of the glass bulb 1 is frosted, silica coating is more preferable because it attains more easily the prescribed luminous characteristics.

FIG. 2 shows a small-sized xenon gas-enclosed incandescent lamp for usual illumination, rated voltage of 100V, rated wattage of 60W, wherein the glass bulb 1 in FIG. 1 is replaced with a glass bulb for miniature krypton lamp. Reference numeral 1 designates the glass bulb, maximum diameter of 35 millimeters, maximum length of 67 millimeters, which is made by frosting a soft glass, for example, soda-lime glass and lead glass. Similarly as in FIG. 1, in the glass bulb 1 is mounted a tungsten filament 2 and its ends are connected with lead wires 3, 3. The filament 2 is double-coiled and supported approximately at the center by an anchor wire 8. The lead wires 3, 3 are hermetically sealed in a stem bulb and their lead-out portions are connected with an eyelet 5 or a base 6 of brass or aluminum alloy. The glass bulb 1 encloses a filling composition 7 for incandescent lamp, prepared by mixing xenon gas and nitrogen gas at a ratio of 20:80 to 75:25 by volume, to give about 600 torr at ambient temperature and about 760 torr in incandescent state.

Similarly as the incandescent lamp shown in FIG. 1, this embodiment is favorably usable in various lighting devices using incandescent lamp as luminous source. In addition, this embodiment is suitable in lighting devices directed to use in limited space because this embodiment uses the glass bulb 1 of a relatively small size.

Several experiments on xenon gas-enclosed incandescent lamps as shown in FIGS. 1 and 2 will be explained below.

Experiment 1

Five varieties of xenon gas-enclosed incandescent lamps wherein xenon gas and nitrogen gas were enclosed in the glass bulb 1 in FIG. 1 at a ratio of 10:90, 20:80, 50:50, 75:25 or 90:10 by volume were tested for their life expectancy, luminous efficiency and color temperature (K) in usual manner when operated at dc 125V. In addition, these incandescent lamps were determined for their arc starting voltage (% volt) against their rated voltage to evaluate tendency to arc discharge.

An argon gas-enclosed incandescent lamp as control was prepared similarly as above, except that 90% by volume of argon gas (Ar) was enclosed in place of xenon gas (Xe). The life expectancy and luminous efficiency of the xenon gas-enclosed incandescent lamps were expressed by percentage, provided that those for the argon gas-enclosed incandescent lamp were considered as 100. The results were as shown in Table 1.

TABLE 1

| Composition of enclosed gas (% by volume) | | | Life expectancy (%) | Luminous efficiency (%) | Color temperature (K.) | Arc starting voltage (% volt) |
| --- | --- | --- | --- | --- | --- | --- |
| Xe | Ar | N₂ | | | | |
| 10 | 0 | 90 | 200 | 101 | 2,930 | 170 or higher |
| 20 | 0 | 80 | 340 | 103 | 2,960 | 170 or higher |
| 50 | 0 | 50 | 540 | 105 | 2,980 | 170 or higher |
| 75 | 0 | 25 | 510 | 107 | 3,010 | 170 or higher |
| 90 | 0 | 10 | 470 | 108 | 3,020 | lower than 140 |
| 0 | 90 | 10 | 100 | 100 | 2,940 | — |

As obvious from the results in Table 1, it was found that the incandescent lamps enclosing xenon gas and nitrogen gas at a ratio of about 20:80 to about 75:25 by volume were extremely long in life expectancy, i.e. about 3-fold or longer than the argon gas-enclosed incandescent lamp as the control when operated at dc 125V which corresponded to 125% of their rating. With respect to arc starting voltage, the combination of xenon gas and nitrogen gas at a ratio of about 20:80 to about 75:25 by volume led to a sufficiently high arc starting voltage, i.e. about 170% volts or higher, which would cause no problem in practical use.

Although the incandescent lamp enclosing a composition consisting of 10% by volume of xenon gas and 90% by volume of nitrogen exhibited a practically-acceptable high arc starting voltage, i.e. 170% volts or higher, the improvement in life expectancy and luminous efficiency was less than that as expected from the increase in cost due to xenon gas and no improvement in color temperature was noted. It was found that although incorporation of 90% by volume of xenon gas led to in a significant improvement in life expectancy, efficiency and color temperature, the increase in cost was more than the effect and the reduced arc starting voltage was no longer acceptable to practical use.

Experiment 2

Five varieties of xenon gas-enclosed incandescent lamps wherein xenon gas and nitrogen gas were enclosed at a ratio of 10:90, 20:80, 50:50, 75:25 or 90:10 by volume in the glass bulb 1 in FIG. 2 were tested for their life expectancy, luminous efficiency, color temperature (K) and arc starting voltage similarly as in Experiment 1 when operated at dc 113V.

A krypton gas-enclosed incandescent lamp as control was prepared similarly as above except that 90% by volume of krypton gas (Kr) was enclosed in place of xenon gas (Xe). The life expectancy and luminous efficiency of the xenon gasenclosed incandescent lamps were expressed by percentage, provided that those for the krypton gas-enclosed incandescent lamp were considered as 100. The results were as shown in Table 2.

As obvious from the results in Table 2, it was found that the incandescent lamps enclosing xenon gas and nitrogen gas at a ratio of about 20:80 to about 75:25 by volume were extremely long in life expectancy, i.e. about 3-fold or longer than the argon gas-enclosed incandescent lamp as the control when operated at dc 113V which corresponded to 113% of their rating. Also was found that with respect to arc starting voltage, the combination of xenon gas and nitrogen gas at ratio of about 20:80 to about 75:25 by volume led to a sufficiently high arc starting voltage, i.e. about 170% volts or higher, which would cause no problem in practical use.

TABLE 2

| Composition of enclosed gas (% by volume) | | | Life expectancy (%) | Luminous efficiency (%) | Color temperature (K.) | Arc starting voltage (% volt) |
| --- | --- | --- | --- | --- | --- | --- |
| Xe | Kr | N$_2$ | | | | |
| 10 | 0 | 90 | 160 | 101 | 2,910 | 170 or higher |
| 20 | 0 | 80 | 290 | 102 | 2,950 | 170 or higher |
| 50 | 0 | 50 | 360 | 103 | 2,960 | 170 or higher |
| 75 | 0 | 25 | 420 | 104 | 2,970 | 170 or higher |
| 90 | 0 | 10 | 440 | 104 | 2,970 | lower than 140 |
| 0 | 90 | 10 | 100 | 100 | 2,920 | — |

Although the incandescent lamp enclosing a composition consisting of 10% by volume of xenon gas and 90% by volume of nitrogen also exhibited a practically-acceptable high arc starting voltage, i.e. 170% volts or higher, the improvement in life expectancy and luminous efficiency was less than that as expected from the increase in cost due to xenon gas and no improvement in color temperature was noted. It was found that although incorporation of 90% by volume of xenon gas led to in a significant improvement in life expectancy, efficiency and color temperature, the increase in cost was more than the effect and the reduced arc starting voltage was no longer acceptable to practical use.

Comparison of the incandescent lamps as shown in FIGS.1 and 2 resulted in the finding that although, in general, both lamps had approximately the same properties, the embodiment shown in FIG. 1 was significantly superior to that in FIG. 2 in life expectancy and luminous efficiency. This would suggest that an absolute quantity of xenon gas in glass bulb do influence the life expectancy and luminous characteristics of incandescent lamps.

Several lighting devices according to this invention will be explained hereinafter in conjunction with the Figures.

FIG. 3 shows a blockdiagram of an embodiment according to this invention, wherein an ac terminal of a rectifier circuit comprising a bridge rectifier D and a smoothing capacitor C is connected with an ac source AC through an arc discharge current-limiting circuit 9, while a xenon gas-enclosed lamp XL is connected with a dc terminal of the bridge rectifier D through a rush current-limiting circuit 10.

The arc discharge current-limiting circuit 9, usually comprising an inductor, capacitor and/or resistor, is to limit an arc discharge current which may occur upon burnout of lamp filament, as well as to stop the arc discharge per se. Such an arc discharge usually occurs in short-circuit manner to arise in the main current circuit a continuous current surge of up to 200 amperes which has a possibility of greatly damaging circuits elements such as rectifier and thyristor.

The inductance, capacitance and resistance of the inductor, capacitor and resistor used in the arc discharge current-limiting circuit 9 are set in such manner that, when the main current circuit is in stationary state, they cause no substantial voltage drop at the ac terminal of the rectifier D, but effectively limits an arc discharge current to suspend the arc discharge if such an arc discharge occurs.

In view of heat generation during operation, inductor is the most desirable element which is used to compose the arc discharge current-limiting circuit 9. An inductor of corelessor core-type such as winding iron core-type and laminating iron-type, or highly-efficient and space-saving type such as troidal coil can be used as the inductor, as long as it limits arc discharge current when connected with the ac terminal of the rectifier circuit bearing a smoothing capacitor C. The inductance of such an inductor is chosen in such manner that the resonance circuit formed together with the smoothing capacitor C advances the phase difference between the voltage and current components in arc discharge current, in other words, decreases its effective power.

The use of an inductor with a relatively low dc resistance results in a less heat generation by the inductor per se, as well as in an effective limitation of arc discharge current. For example, in the case of operating xenon gasenclosed incandescent lamp, rated voltage of 100–110 volts, rated wattage of 40–100 watts, at a dc voltage exceeding the rating but not exceeding 150% thereof, desirably, a dc voltage in the range of about 105–130% of the rating, a desirable inductance lies in the range of about 1 to about 10 millihenries when the capacitance of the smoothing capacitor C is about 30–100 microfarads. The arc discharge current-limiting circuit 9 also limits switch-on rush currents into incandescent lamp and smoothing current which will be described hereinafter.

The filament resistance of xenon gas-enclosed incandescent lamp at ambient temperature is several tenth parts of that in incandescent state. With this reason, the application of a voltage exceeding the rating of the incandescent lamp results in a rush current which may reach up to several folds of stationary current or higher to accelerate the vaporization and burnout of the lamp filament. The rush current-limiting circuit 10 is to limit such a rush current and also to prevent the shortening of life due to the rush current. The rush current-limiting circuit 10 usually comprises a current limiting means such as resistor which is connected in series with incandescent lamp, a thyristor having a main current path connected in parallel with the current limiting means, and a triggering circuit which delays the conduction of the thyristor by a prescribed time after switch-on. The resistance of the current limiting means is chosen in such manner that its combined resistance with the filament at ambient temperature is approximately the same as the filament resistance in incandescent state.

With this arrangement, the current limiting means is left connected in series with the incandescent lamp over the prescribed time to limit possible rush current and also to preheat the filament. After a lapse of the prescribed time, the thyristor is triggered to bypass the current limiting means to supply to the incandescent lamp a voltage exceeding its rating. Thus, the rush current into incandescent lamp can be extremely reduced or even eliminated.

Figure 4:
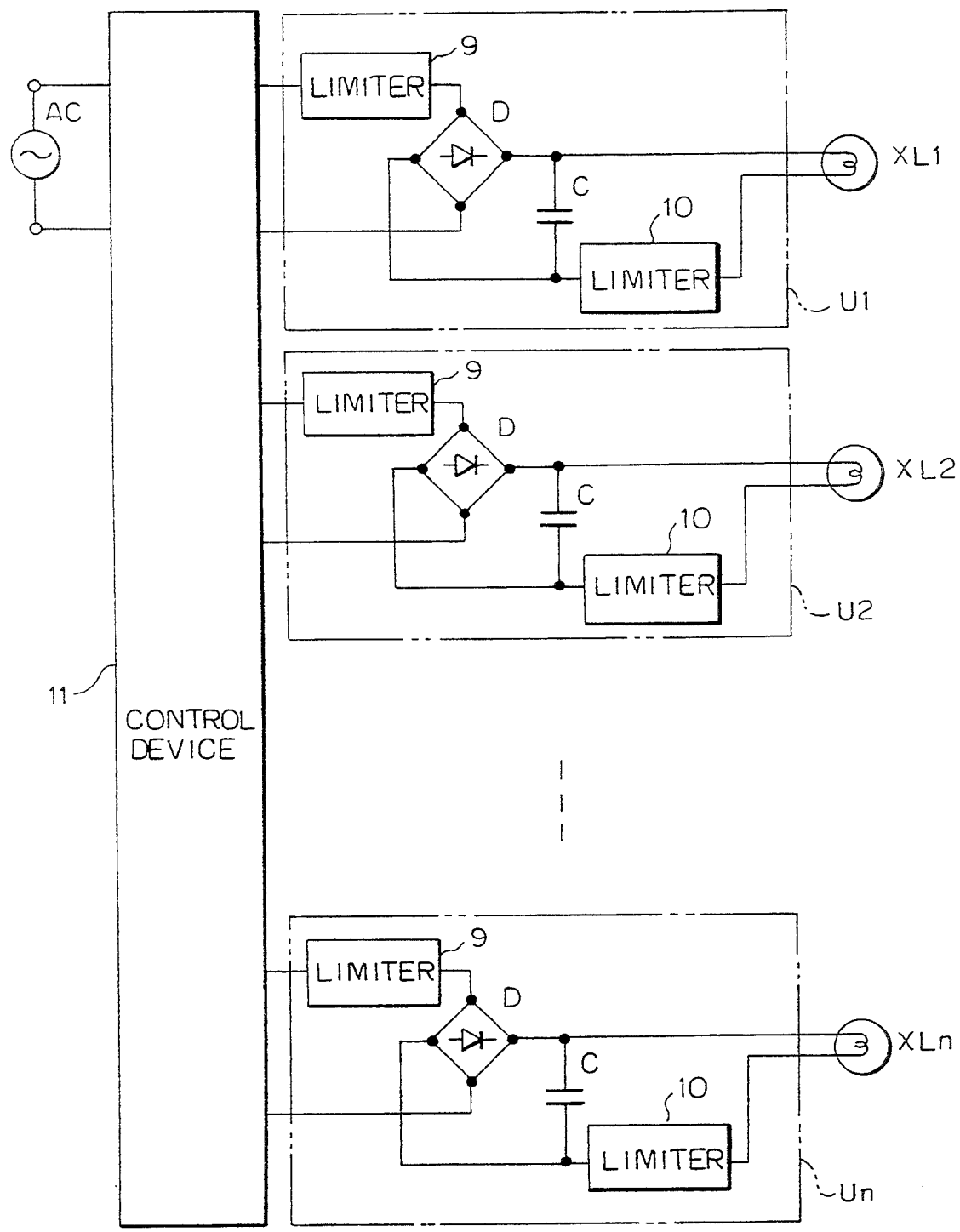
FIG. 4 is a blockdiagram of a lighting system using lighting units according to this invention.

FIG. 4 is an example of a lighting system wherein a plurality of lighting units as shown in FIG. 3 are controlled by a lighting control device bearing, for example, dimming and switching circuits.

More particularly, in this lighting system, a plurality of lighting units $U_1$, $U_2$..., $U_n$ respectively comprising a rectifier circuit bearing a smoothing circuit as shown in FIG. 3, an arc discharge current-limiting circuit, and a rush current-limiting circuit are equipped with xenon gas-enclosed incandescent lamps $XL_1$, $XL_2$..., $XL_n$ having a desired rated wattage, and connected with an ac source AC through a lighting control device 11 which bears, for example, dimming and switching circuits.

The lighting control device 11 and the power sources and incandescent lamps in respective lighting units can be located as follows: For example, the lighting control device 11 and power sources are located at the same place, while the incandescent lamps are located at desired places in housings and buildings. Alternatively, the lighting control device 11 is located at an appropriate place in housings and buildings, while a plurality of units containing a power source and an incandescent lamp are located at desired places in the housings and buildings.

Figure 5:
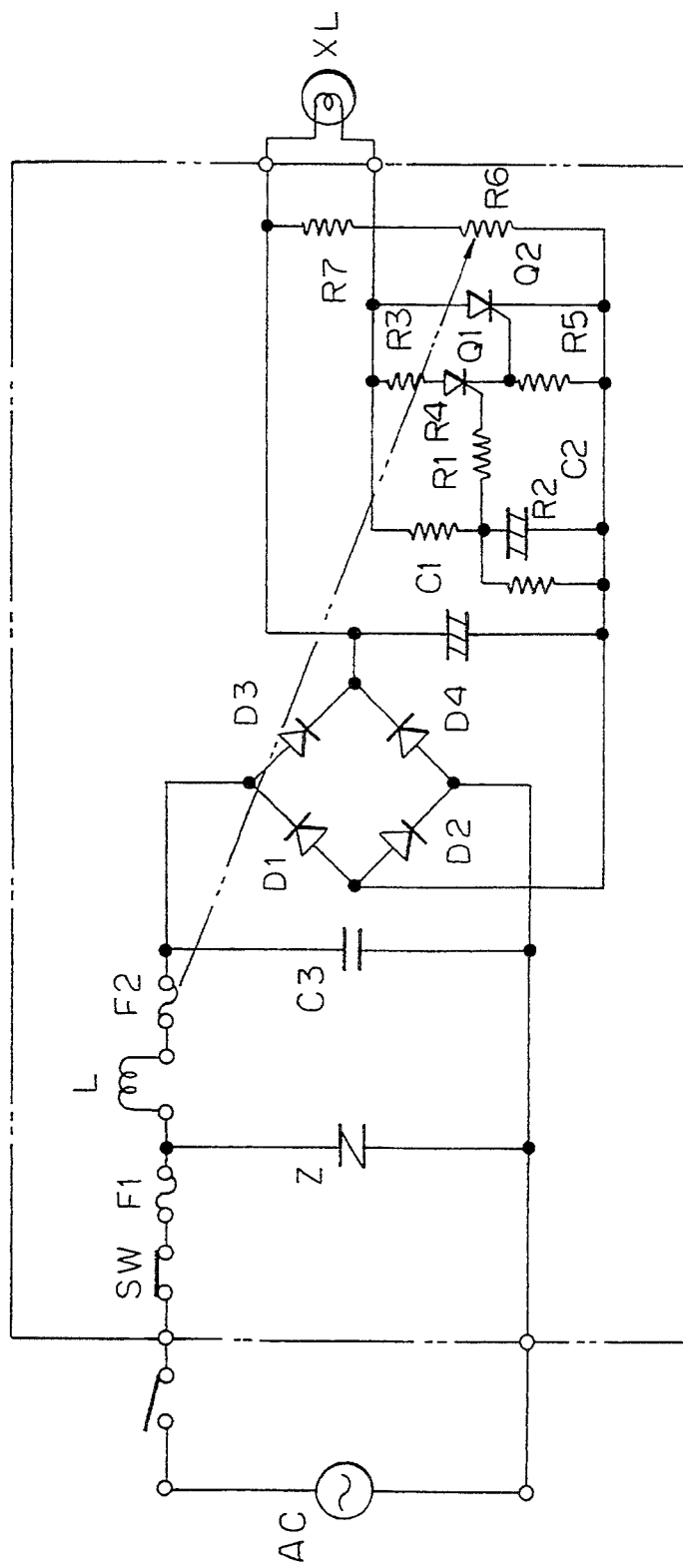
FIG. 5 is an electric circuit of an embodiment according to this invention.

FIG. 5 shows an electric circuit of the lighting device or unit as shown in FIG. 3 or 4. In FIG. 5, an ac terminal of a bridge rectifier consisting of rectifier diodes $D_1$, $D_2$, $D_3$ and $D_4$ is connected with a power source AC through a power switch SW, fuses $F_1$ and $F_2$ and an inductor L, while a dc terminal of the bridge rectifier is connected with a smoothing capacitor $C_1$ and a xenon gas-enclosed incandescent lamp XL through a triggering circuit consisting of resistors $R_1$, $R_2$, $R_3$, $R_4$ and $R_5$, a capacitor $C_2$ and thyristors $Q_1$ and $Q_2$, and through a resistor $R_6$ as rush current-limiting circuit.

A capacitor $C_3$ and a zener diode Z both connected with the ac terminal of the bridge rectifier are to absorb pulse voltages which may occur at the ac terminal to stabilize its input voltage. The resistor $R_6$ and fuse $F_2$ are arranged to operate in association so that, if the temperature of the resistor $R_6$ increases with an abnormality, the fuse $F_2$ melts off to automatically break the main current circuit.

The operation of this example will be explained hereinafter. When the power switch SW is closed, an ac current from the ac source AC is subjected to full-wave rectification by the bridge rectifier and smoothed by the smoothing capacitor $C_1$, and the dc voltage across the smoothing capacitor $C_1$ is applied to the series circuit of the incandescent lamp XL and resistor $R_6$.

While charging of the capacitor $C_2$ in the triggering circuit is initiated immediately after switch-on of the power switch SW, and, after a lapse of the time as determined by the time constant of the resistor $R_4$ and capacitor $C_2$, the voltage across the capacitor $C_2$ is applied to a gate of the thyristor $Q_1$ to bring it into conduction. The conduction current through the thyristor $Q_1$ is applied in turn to a gate of the thyristor $Q_2$ to bring it conduction. Conduction of the thyristor $Q_2$ bypasses the resistor $R_6$ connected in parallel with a main current path of the thyristor $Q_2$. Thus, a prescribed voltage is applied to the incandescent lamp XL.

Since the filament resistance of the incandescent lamp XL immediately after switch-on of the power switch SW is several tenth parts of that in incandescent state, any shortening of its life due to rush current can be prevented by setting the resistor $R_6$ in such manner that its combined resistance with the filament is approximately equal to its resistance in incandescent state. In this case, by setting the above described time constant long enough to preheat the filament of the incandescent lamp XL, the rush current into the incandescent lamp XL can be substantially eliminated.

Furthermore, this example has the merits that the thyristor $Q_2$ can be triggered with a relatively small current because in this example two thyristors are used in cascade connection, and that, even when the ambient temperature greatly varies, the triggering circuit is much more surely operated than in the case of using only one thyristor.

If the filament of the incandescent lamp XL is burn out, an arc discharge occurs between the resultant filament gap and a sudden arc discharge current may flow into the main current circuit. The inductor L provided at the ac terminal of the bridge rectifier effectively makes a loss on any current surge into the main current circuit to suspend such an arc discharge current and also to stop the arc discharge per se. If the arc discharge restores, it is suppressed again by the inductor L and never continues even after the filament gap is enlarged. Furthermore, if the power switch SW is still closed after the arc discharge is stopped, the arc discharge never restore because the filament has been burn out.

Since this example is arranged in this way, by operating xenon gas-enclosed incandescent lamp at a dc voltage exceeding its rating but not exceeding 150% thereof, desirably, a dc voltage in the range of about 105–130% of the rating, one can obtain over a long time period a flickerless, natural light with a color temperature of about 2,900K or higher, desirably, in the range of about 2,950–3,100K, which is excellent in color rendering properties and gentle to the eye.

Furthermore, this example can be safely used because, if burnout of filament arises arc discharge, the current surge due to the arc discharge is effectively limited.

FIG. 6 is an electric circuit of another embodiment according to the invention using an inverter circuit.

An ac terminal of a bridge rectifier $D_1$ is connected with an ac source AC, while a dc terminal of the bridge rectifier $D_1$ is connected with a smoothing capacitor $C_1$. An input terminal of an inverter circuit 12 generating a high-frequency current is connected between both ends of the capacitor $C_1$, while an output terminal of the inverter circuit 12 is connected through a rectifier diode $D_2$ with an integration circuit comprising a capacitor $C_2$. A xenon gas-enclosed incandescent lamp XL is connected between both ends of the capacitor $C_2$.

In the inverter circuit 12 is provided an inverter transformer T and a transistor Tr, and a capacitor $C_3$ is connected in parallel with a primary winding $L_1$ of the inverter transformer T. Both ends of the capacitor $C_3$ are connected with a positive end of the smoothing capacitor $C_1$ and a collector of the transistor Tr. One end of a base winding $L_2$ of the inverter transformer T is connected with a base of the transistor Tr through a capacitor $C_4$, while the other end of the base winding $L_2$ is connected with a negative end of the smoothing capacitor $C_1$. The base of the transistor Tr is also connected with a positive end of the smoothing capacitor $C_1$ through a resistor R. A second winding $L_3$ of the inverter transformer T provides an output terminal of the inverter circuit 12, and particular circuit constants of the inverter circuit 12 and capacitor $C_2$ are chosen in such manner that the voltage across the incandescent lamp XL exceeds the effective voltage of the ac source AC but does not exceed 150% thereof, desirably, in the range of about 105-130% thereof, as well as that the current across the filament exceeds its rating but does not exceed 150% thereof, desirably, in the range of about 105-130% thereof.

Now explaining the operation of this example, when the ac power source AC is closed, the ac current therefrom is subjected to full-wave rectification by the bridge rectifier $D_1$, and smoothed by the smoothing capacitor $C_1$ into a pulsating or dc current which is then supplied to the inverter circuit 12. This induces the oscillation of the inverter circuit 12 to output a high-frequency voltage at the secondary winding $L_3$ of the inverter transformer T. The high-frequency voltage is subjected to half-wave rectification by the diode $D_2$, integrated by the capacitor $C_2$, and supplied to the incandescent lamp XL.

Since this example is arranged in this way, by operating xenon gas-enclosed incandescent lamp at a voltage exceeding its rating but not exceeding 150% thereof, desirably, at a dc voltage in the range of about 105-130% of the rating, one can obtain over a long time period a natural light with a less flicker and a color temperature of about 2,900K or higher, desirably, in the range of about 2,950-3,100K, which is excellent in color rendering properties and gentle to the eye.

FIG. 7 is an electric circuit of still another embodiment according to the invention, wherein xenon gas-enclosed incandescent lamp is operated at an ac voltage exceeding its rating.

In this example, there is provided secondary windings $L_2$, $L_3$, $L_4$ and $L_5$ having respective winding ratio, for example, of 100:110, 100:115, 100:120 and 100:125 against a primary winding $L_1$, and a power switch $SW_1$ is provided in such manner that it can be operated in association with a switch $SW_2$ which is used to switch the secondary windings. Thus, the voltage across a xenon gas-enclosed incandescent lamp XL can be freely changed in the range of 100-125V. Furthermore, a thermistor Th is provided in the secondary circuit of the transformer T so that rush current due to switch-on of the power switch $SW_1$ is limited by utilizing the property of thermistor that its electric resistance lowers as the ambient temperature increases.

Since this example is arranged in this way, by operating the incandescent lamp XL at an ac voltage exceeding its rating but not exceeding 150% thereof, desirably, in the range of about 105-130% of the rating, one can obtain over a long time period a natural light with a slight flicker and a color temperature of about 2,900K or higher, desirably, in the range of about 2,950-3,100K, which is excellent in color rendering properties and gentle to the eye.

Furthermore, this example can be simplified because the transformer T also limits rush current due to switch-on of the power switch $SW_1$, and the attachment of the transformer T to the bottom of the lighting device helps it to stabilizes its settlement. Although in FIG. 7 only one incandescent lamp is attached, of course, a plurality of incandescent lamps can be simultaneously operated with one lighting device when the total wattage of the incandescent lamps are within the power capacity of the transformer T.

As described above, by the practice of this invention, one can obtain incandescent lamps which hardly causes arc discharge when operated at a relatively high voltage, enclosing xenon gas in an amount up to about 20-75% by volume against the whole enclosed gaseous ingredients.

The incandescent lamp of this invention emits a light with excellent luminous characteristics over an extended time period when operated at a relatively high voltage, therefore the lamp is favorably usable in various lighting devices using incandescent lamp as luminous source.

Furthermore, since the filling composition for incandescent lamp according to this invention attains prescribed features in a relatively small amount, soft glass bulbs can be used with no special care and this facilitates or reduces the production and production cost of incandescent lamps.

In addition, this invention is characterized in that, by the practice of this invention, one can obtain a light with excellent luminous characteristics over a long time period.

In this case, by operating the present incandescent lamp at a voltage exceeding its rating but not exceeding 150% thereof, one can obtain over a long time period a natural light with a color temperature of about 2,900K or higher which is superior in color rendering properties and gentle to the eye.

Thus, the lighting device of this invention is favorably usable in various housings and buildings for illumination.

Further, the present incandescent lamp emits a light which is natural and closer to morning sunlight when operated at a voltage exceeding the rating but not exceeding 150% thereof. Such a light is remarkably efficacious in the prevention and treatment of diseases, for example, eyestrain, asthenopia, myopia, pseudomyopia and depression, as well as being superiorly effective in the improvement of growth and productivity of animals and plants. Thus, the lighting device of this invention is suitable for physicotherapeutic means in domestic and medical uses, for example, in hospital and clinic, as well as lighting devices in cultivating farms and factories such as poultry farm, fish farm and plant factory, This invention attaining such remarkable effects would greatly contribute to the art.

We claim:

1. A filling composition for incandescent lamp, consisting of 20-75% by volume of xenon gas, and 25-80% by volume of nitrogen gas.

2. An incandescent lamp which encloses a filling composition consisting of 20-70% by volume of xenon gas, and 25-80% by volume of nitrogen gas; and has an operating voltage of about 90–150v and a rated wattage of 40–100w.

3. An incandescent lamp which encloses a filling composition consisting of 20–75% by volume of xenon gas, and 25–80% by volume of nitrogen gas; and has an operating voltage of about 90–150v and a rated wattage of 40–100w; wherein said filling composition is enclosed to give a pressure of about 700–800 torr in incandescent state.

4. The lamp of claim 3, the arc starting voltage of which is not lower than 170% of its rating.

5. The lamp of claim 3, which exhibits a life expectancy not shorter than about 3,000 hours when operated on its rating.

6. The lamp of claim 3, which exhibits a life expectancy not shorter than about 200 hours when operated at a voltage in the range of about 105–130% of its rating.

7. The lamp of claim 3, which emits a light with a color temperature not lower than about 2,900 K. when operated at a voltage exceeding its rating but not exceeding 150% thereof.

8. A lighting device comprising:
an incandescent lamp as luminous source, said incandescent lamp enclosing a filling composition consisting of 20–75% by volume of xenon gas and 25–80% by volume of nitrogen gas, and having a rated wattage of 40–100 w; and
a power source to operate said incandescent lamp, said power source being capable of operating said incandescent lamp at a wattage in the range of about 90–150 v.

9. The device of claim 8, wherein said incandescent lamp is operated at a voltage exceeding its rating but not exceeding 150% thereof.

10. The device of claim 8, where said power source comprises a rectifier circuit with smoothing means to convert ac into dc.

11. The device of claim 8, wherein said power source is of inverter type.

12. The device of claim 8, wherein said power source is of switching regulator type.

13. A lighting device comprising
an incandescent lamp as luminous source, said incandescent lamp enclosing a filling composition consisting of 20–75% by volume of xenon gas and 25–80 by volume of nitrogen gas, wherein said incandescent lamp has an arc starting voltage not lower than 170% of its rating, and a rated wattage of 40–100w; and
a power source to operate said incandescent lamp, said power source be capable of operating said incandescent lamp at a voltage in the range of about 90–150v.

14. The device of claim 13, wherein said incandescent lamp exhibits a life expectancy not shorter than about 3,000 hours when operated on its rating.

15. The device of claim 13, wherein said incandescent lamp exhibits a life expectancy not shorter than about 200 hours when operated at a voltage in the range of about 105–130% of its rating.

16. The device of claim 13, which emits a light with a color temperature not lower than about 2,900K when operated at a voltage exceeding its rating but not exceeding 150% thereof.

* * * * *